(12) United States Patent
Yoshino

(10) Patent No.: US 9,921,062 B2
(45) Date of Patent: Mar. 20, 2018

(54) SURVEYING INSTRUMENT

(71) Applicant: TOPCON Corporation, Tokyo-to (JP)

(72) Inventor: Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 140 days.

(21) Appl. No.: 15/158,629

(22) Filed: May 19, 2016

(65) Prior Publication Data

US 2016/0349050 A1    Dec. 1, 2016

(30) Foreign Application Priority Data

May 28, 2015   (JP) ................................ 2015-108589

(51) Int. Cl.
 *G01C 15/00*   (2006.01)
 *G01S 17/02*   (2006.01)
 *G01S 17/42*   (2006.01)

(52) U.S. Cl.
 CPC ......... *G01C 15/008* (2013.01); *G01C 15/002* (2013.01); *G01S 17/023* (2013.01); *G01S 17/42* (2013.01)

(58) Field of Classification Search
 CPC ......... G01C 15/002; G01C 1/02; G01S 17/08; G01S 17/66; G01S 3/786; G01S 7/4811
 (Continued)

(56) References Cited

U.S. PATENT DOCUMENTS 5,784,155 A * 7/1998 Ohtomo ............... G01C 15/004
                                                       356/141.1
5,946,087 A * 8/1999 Kasori ................. G01C 15/004
                                                       356/139.1
(Continued)

FOREIGN PATENT DOCUMENTS

EP    2489980 A2   8/2012
EP    2775257 A1   9/2014
(Continued)

OTHER PUBLICATIONS

European communication dated Oct. 27, 2016 in co-pending European patent application No. 16169403.9.
(Continued)

*Primary Examiner* — Yaritza Guadalupe-McCall
(74) *Attorney, Agent, or Firm* — Nields, Lemack & Frame, LLC

(57) ABSTRACT

The invention provides a surveying instrument, which comprises a horizontal rotating unit, a measuring unit installed on the horizontal rotating unit, a coupler for mechanically coupling the horizontal rotating unit with the measuring unit, and a connector for electrically connecting the horizontal rotating unit with the measuring unit, wherein the coupler couples the horizontal rotating unit with the measuring unit and can separate from each other, the connector can electrically connect the horizontal rotating unit with the measuring unit and can separate from each other, wherein the horizontal rotating unit comprises a driving unit for rotating the measuring unit, a horizontal angle detector for detecting a horizontal angle, and a horizontal angle control unit for calculating horizontal angle data based on a signal from the horizontal angle detector and for controlling the driving unit, wherein the measuring unit comprises a distance measuring unit for performing a distance measurement, a vertical angle detector for detecting a vertical angle at a time of distance measurement, a vertical angle control unit for calculating vertical angle data based on detection results from the vertical angle detector, a coordinate calculating unit, and a main control unit, wherein the horizontal angle control unit transmits the horizontal angle data at the time of distance measurement to the coordinate calculating unit via the connector based on a control signal from the main control unit and distance measurement data by the distance measuring unit and the vertical angle data from the (Continued)

vertical angle control unit are inputted to the coordinate calculating unit, and the coordinate calculating unit is constituted so as to calculate three-dimensional data based on the horizontal angle data, the distance measurement data and the vertical angle data.

8 Claims, 3 Drawing Sheets

(58) Field of Classification Search
 USPC .......................................................... 33/281
 See application file for complete search history.

(56) References Cited

U.S. PATENT DOCUMENTS

| | | | | |
|---|---|---|---|---|
| 6,011,613 | A * | 1/2000 | Ohtomo | G01C 15/004 356/139.07 |
| 6,249,338 | B1 * | 6/2001 | Ohtomo | G01C 15/004 356/139.07 |
| 7,433,028 | B2 * | 10/2008 | Kumagai | G01C 15/004 356/139.03 |
| 2002/0092185 | A1 * | 7/2002 | Wu | G01C 15/004 33/281 |
| 2007/0103672 | A1 * | 5/2007 | Kumagai | G01C 15/004 356/139.03 |
| 2008/0075326 | A1 | 3/2008 | Otani et al. | |
| 2009/0119050 | A1 * | 5/2009 | Hayashi | G01C 11/06 702/94 |
| 2009/0133273 | A1 * | 5/2009 | Westermark | G01C 15/002 33/281 |
| 2012/0166137 | A1 | 6/2012 | Grässer et al. | |
| 2012/0249997 | A1 * | 10/2012 | Matsumoto | G01S 7/4817 356/4.01 |
| 2015/0042977 | A1 | 2/2015 | Siercks et al. | |
| 2016/0349050 | A1 * | 12/2016 | Yoshino | G01C 15/008 |
| 2016/0349051 | A1 * | 12/2016 | Kumagai | G01C 15/002 |

FOREIGN PATENT DOCUMENTS

| | | |
|---|---|---|
| JP | 2008-82707 A | 4/2008 |
| WO | 2015/006526 A1 | 1/2015 |

OTHER PUBLICATIONS

The Kellogg Report, "How Does Robotic Positioning Work," Dec. 1, 2010, http://kelloggreport.com/how-does-a-Robotic-Total-Station-work.html.
European communication dated Nov. 7, 2016 in corresponding European patent application No. 16169389.0.
Notice of allowance dated Nov. 8, 2017 in co-pending U.S. Appl. No. 15/158,631.

\* cited by examiner

SURVEYING INSTRUMENT

BACKGROUND OF THE INVENTION

The present invention relates to a surveying instrument, by which it is possible to perform measurements in different modes of measurement such as a measurement of a point to be measured or an acquisition of a point cloud data of an object to be measured, and the like.

Conventionally, a total station is used in a case where a measurement of a point to be measured is performed and a laser scanner is used in a case where a shape of an object to be measured is to be determined. The laser scanner determines the shape of the object to be measured as a group of innumerable points with coordinates.

Since measurement methods of the total station and the laser scanner are different, the surveying instruments do not have interchangeability, and a total station or a laser scanner was necessary, corresponding to respective measurement modes of the case where measurement of a point to be measured is performed or the case where measurement of a shape of the object to be measured is performed.

Therefore, a plurality of different surveying instruments are necessary and an equipment cost becomes expensive. In particular, a laser scanner is an expensive device and much burden in terms of cost has been required to equip.

SUMMARY OF THE INVENTION

It is an object of the present invention to provide a surveying instrument, by which it is possible to correspond to cases of different measurement modes, such as a case where a point to be measured is measured or a case where point cloud data of an object to be measured are acquired, or the like.

To attain the object as described above, a surveying instrument according to the present invention comprises a horizontal rotating unit, a measuring unit installed on the horizontal rotating unit, a coupler for mechanically coupling the horizontal rotating unit with the measuring unit, and a connector for electrically connecting the horizontal rotating unit with the measuring unit, wherein the coupler couples the horizontal rotating unit with the measuring unit and can separate from each other, the connector can electrically connect the horizontal rotating unit with the measuring unit and can separate from each other, wherein the horizontal rotating unit comprises a driving unit for rotating the measuring unit, a horizontal angle detector for detecting a horizontal angle, and a horizontal angle control unit for calculating horizontal angle data based on a signal from the horizontal angle detector and for controlling the driving unit, wherein the measuring unit comprises a distance measuring unit for performing a distance measurement, a vertical angle detector for detecting a vertical angle at a time of distance measurement, a vertical angle control unit for calculating vertical angle data based on detection results from the vertical angle detector, a coordinate calculating unit, and a main control unit, wherein the horizontal angle control unit transmits the horizontal angle data at the time of distance measurement to the coordinate calculating unit via the connector based on a control signal from the main control unit and distance measurement data by the distance measuring unit and the vertical angle data from the vertical angle control unit are inputted to the coordinate calculating unit, and the coordinate calculating unit is constituted so as to calculate three-dimensional data based on the horizontal angle data, the distance measurement data and the vertical angle data.

Further, in the surveying instrument according to the present invention, the horizontal rotating unit has a leveling unit, the measuring unit has a tilt sensor for detecting a tilting in two horizontal directions, and a mounting condition of the measuring unit with respect to the horizontal rotating unit of the measuring unit is corrected so that the tilt sensor detects a horizontality under a condition where the horizontal rotating unit is leveled horizontally by the leveling unit.

Further, in the surveying instrument according to the present invention, the measuring unit is a two-dimensional scanner unit, wherein the two-dimensional scanner unit emits a pulsed distance measuring light and is provided on a distance measuring unit for performing distance measurement per each the pulsed distance measuring light and on a vertical rotation shaft having a horizontal axis, and comprises a scanning mirror for rotatably irradiating the pulsed distance measuring light, a motor for rotating the vertical rotation shaft and a vertical angle detector for detecting a vertical angle of the vertical rotation axis, wherein the measuring unit is constituted so as to acquire two-dimensional point cloud data based on the distance measurement result of the distance measuring unit and on a vertical angle at the time of distance measurement as detected by the vertical angle detector, the two-dimensional point cloud data are inputted to the coordinate calculating unit and three-dimensional point cloud, data are calculated by the coordinate calculating unit.

Further, in the surveying instrument according to the present invention, the measuring unit is a sighting distance measuring unit, wherein the sighting distance measuring unit comprises a telescope unit rotatable in a vertical direction, a motor for rotating the telescope unit in a vertical direction, and a vertical angle detector for detecting a vertical angle of the telescope unit, wherein the telescope unit has a sighting telescope and a distance measuring unit, the distance measuring unit performs distance measurement of the measuring point under a condition where a predetermined measurement point is sighted by the telescope unit, the vertical angle control unit calculates vertical angle data of the sighting telescope under a sighted condition, and distance measurement data and the vertical angle data based on the distance measurement result of the measuring point are inputted to the coordinate calculating unit.

Furthermore, in the surveying instrument according to the present invention, the two-dimensional scanner unit is mounted on the sighting distance measuring unit via a second coupler, the two-dimensional scanner unit and the horizontal rotating unit are electrically connected via a second connector, it is configured so that the horizontal angle data from the horizontal angle control unit are inputted to the coordinate calculating unit of the two-dimensional scanner unit via the second connector, and it is configured so that the distance measurement of the measuring point by the sighting distance measuring unit and the acquisition of the two-dimensional point cloud data are selectively performed.

According to the present invention, the surveying instrument comprises a horizontal rotating unit, a measuring unit installed on the horizontal rotating unit, a coupler for mechanically coupling the horizontal rotating unit with the measuring unit, and a connector for electrically connecting the horizontal rotating unit with the measuring unit, wherein the coupler couples the horizontal rotating unit with the measuring unit and can separate from each other, the connector can electrically connect the horizontal rotating unit with the measuring unit and can separate from each other, wherein the horizontal rotating unit comprises a driving unit for rotating the measuring unit, a horizontal angle detector for detecting a horizontal angle, and a horizontal angle control unit for calculating horizontal angle data based on a signal from the horizontal angle detector and for controlling the driving unit, wherein the measuring unit comprises a distance measuring unit for performing a distance measurement, a vertical angle detector for detecting a vertical angle at a time of distance measurement, a vertical angle control unit for calculating vertical angle data based on detection results from the vertical angle detector, a coordinate calculating unit, and a main control unit, wherein the horizontal angle control unit transmits the horizontal angle data at the time of distance measurement to the coordinate calculating unit via the connector based on a control signal from the main control unit and distance measurement data by the distance measuring unit and the vertical angle data from the vertical angle control unit are inputted to the coordinate calculating unit, and the coordinate calculating unit is constituted so as to calculate three-dimensional data based on the horizontal angle data, the distance measurement data and the vertical angle data. As a result, the measuring unit can be exchanged with respect to the horizontal rotating unit, a measuring unit corresponding to a measurement mode of measurement can be installed on the horizontal rotating unit, and since the horizontal rotating unit can be commonly used, an equipment cost can be reduced.

Further, according to the present invention, in the surveying instrument, the horizontal rotating unit has a leveling unit, the measuring unit has a tilt sensor for detecting a tilting in two horizontal directions, and a mounting condition of the measuring unit with respect to the horizontal rotating unit of the measuring unit is corrected so that the tilt sensor detects a horizontality under a condition where the horizontal rotating unit is leveled horizontally by the leveling unit. As a result, a highly accurate measurement becomes possible even in a case where the measuring unit is exchanged.

Further, according to the present invention, in the surveying instrument, the measuring unit is a two-dimensional scanner unit, wherein the two-dimensional scanner unit emits a pulsed distance measuring light and is provided on a distance measuring unit for performing distance measurement per each the pulsed distance measuring light and on a vertical rotation shaft having a horizontal axis, and comprises a scanning mirror for rotatably irradiating the pulsed distance measuring light, a motor for rotating the vertical rotation shaft and a vertical angle detector for detecting a vertical angle of the vertical rotation axis, wherein the measuring unit is constituted so as to acquire two-dimensional point cloud data based on the distance measurement result of the distance measuring unit and on a vertical angle at the time of distance measurement as detected by the vertical angle detector, the two-dimensional point cloud data are inputted to the coordinate calculating unit and three-dimensional point cloud data are calculated by the coordinate calculating unit. As a result, the horizontal rotating unit can be commonly used, a lower cost structure can be employed compared to conventional three-dimensional laser scanners, and since it is possible to change to a surveying instrument of other measurement methods, a general versatility is increased.

Further, according to the present invention, in the surveying instrument, the measuring unit is a sighting distance measuring unit, wherein the sighting distance measuring unit comprises a telescope unit rotatable in a vertical direction, a motor for rotating the telescope unit in a vertical direction, and a vertical angle detector for detecting a vertical angle of the telescope unit, wherein the telescope unit has a sighting telescope and a distance measuring unit, the distance measuring unit performs distance measurement of the measuring point under a condition where a predetermined measurement point is sighted by the telescope unit, the vertical angle control unit calculates vertical angle data of the sighting telescope under a sighted condition, and distance measurement data and the vertical angle data based on the distance measurement result of the measuring point are inputted to the coordinate calculating unit. As a result, the horizontal rotating unit can be commonly used, a lower cost structure can be employed compared to conventional total stations, and since it is possible to change to a surveying instrument of other measurement methods, a general versatility is increased.

Furthermore, according to the present invention, in the surveying instrument, the two-dimensional scanner unit is mounted on the sighting distance measuring unit via a second coupler, the two-dimensional scanner unit and the horizontal rotating unit are electrically connected via a second connector, it is configured so that the horizontal angle data from the horizontal angle control unit are inputted to the coordinate calculating unit of the two-dimensional scanner unit via the second connector, and it is configured so that the distance measurement of the measuring point by the sighting distance measuring unit and the acquisition of the two-dimensional point cloud data are selectively performed. As a result, it becomes possible to measure in different modes by a single surveying instrument and an equipment cost is reduced.

DETAILED DESCRIPTION OF THE PREFERRED EMBODIMENT

Figure 1:
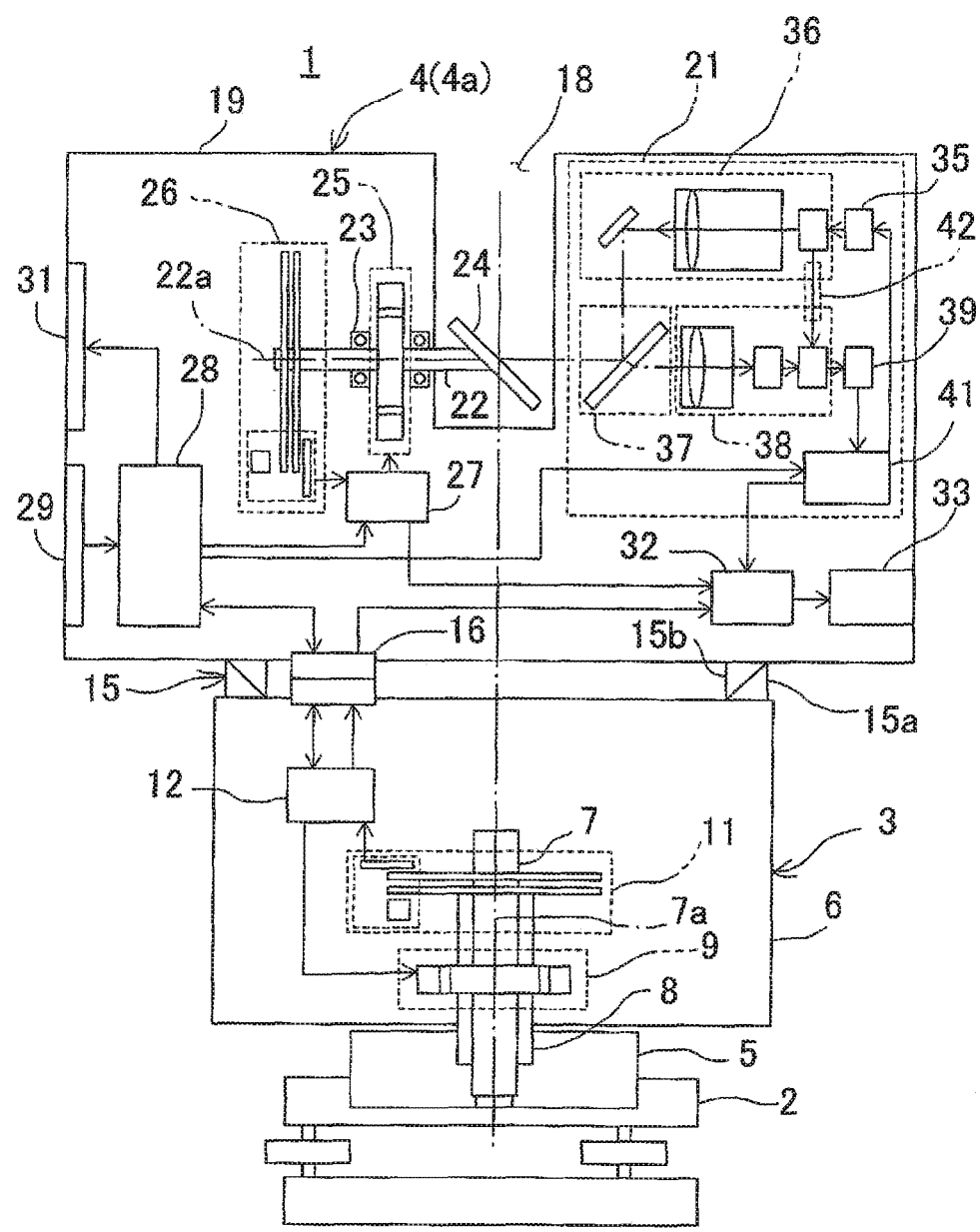
FIG. 1 represents a surveying instrument according to an embodiment of the present invention and shows a block diagram in a case where the surveying instrument is used as a laser scanner.

A description will be given below on embodiments of the present invention by referring to the attached drawings.

In the present invention, a horizontal rotating unit, a measuring unit and the like are constituted respectively as a unit corresponding to functions, a combination of units constitutes a surveying instrument. The units are capable of separating and combining, thereby being capable of corresponding to different measurement modes by a selection of combination of units.

First, referring to FIG. 1, description will be given on a case where a surveying instrument 1 is constituted as a three-dimensional laser scanner which acquires a three-dimensional point cloud data.

The surveying instrument 1 primarily comprises a leveling unit 2 mounted on a tripod (not shown), a horizontal rotating unit 3 provided on the leveling unit 2 and a measuring unit 4, which is removably installed on the horizontal rotating unit 3. In the first embodiment, the measuring unit 4 is designed as a two-dimensional scanner unit 4a.

The horizontal rotating unit 3 comprises a fixed unit 5, a horizontal rotating body 6, a horizontal rotation shaft 7, a horizontal rotation bearing 8, a horizontal rotating motor 9, a horizontal angle encoder 11 as a horizontal angle detector, a horizontal angle control unit 12, and the like.

The horizontal rotation bearing 8 is fixed on the fixing unit 5, the horizontal rotation shaft 7 is rotatably supported on the horizontal rotation bearing 8, the horizontal rotating body 6 is supported by the horizontal rotation shaft 7 and the horizontal rotating body 6 is arranged so as to rotate integrally with the horizontal rotation shaft 7.

Between the horizontal rotation bearing 8 and the horizontal rotating body 6, the horizontal rotating motor 9 is provided, the horizontal rotating motor 9 is controlled by the horizontal angle control unit 12, and it is arranged so that the horizontal angle control unit 12 is made to rotate the horizontal rotating body 6 around the horizontal rotation shaft 7 as the center, by the horizontal rotating motor 9.

A relative rotation displacement of the horizontal rotating body 6 with respect to the fixing unit 5 is detected by the horizontal angle encoder 11. A detection signal from the horizontal angle encoder 11 is inputted to the horizontal angle control unit 12, a horizontal angle detection data is calculated by the horizontal angle control unit 12, and a feedback-control with respect to the horizontal rotating motor 9 is performed by the horizontal angle control unit 12 based on the horizontal angle detection data.

Further, the horizontal angle data from the horizontal angle control unit 12 is sent to the two-dimensional scanner unit 4a via a connector 16.

The two-dimensional scanner unit 4a is removably provided mechanically, on an upper surface of the horizontal rotating unit 3 via a coupler 15.

The coupler 15 comprises a lower coupling element 15a to be fixed on the upper surface of the horizontal rotating unit 3 and an upper coupling element 15b to be fixed on a lower surface of the two-dimensional scanner unit 4a.

The coupler 15 has a coupling function and an alignment function. When the lower coupling element 15a and the upper coupling element 15b are fitted and coupled, an axis 7a of the horizontal rotation shaft 7 is coincided with a machine axis of the two-dimensional scanner unit 4a, and further, it is arranged so that the horizontal rotating unit 3 and the two-dimensional scanner unit 4a are rotated integrally.

Here, the machine axis is extended in a vertical direction and perpendicularly crosses an axis of a vertical rotation shaft 22 (to be described later) and passes a point where a distance measuring light (to be described later) enters a scanning mirror 24 (to be described later).

Further, the horizontal rotating unit 3 and the two-dimensional scanner unit 4a are electrically connected by a connector 16.

The connector 16 is designed in a separable structure and when the two-dimensional scanner unit 4a is mechanically mounted on the horizontal rotating unit 3, the two-dimensional scanner unit 4a and the horizontal rotating unit 3 are electrically connected.

Here, as the electrical connection, a contact or a non-contact connecting means such as an electrical contact, a capacitive coupling, an inductive coupling, a wireless means, etc. can be used.

The two-dimensional scanner unit 4a comprises a housing 19 with a recessed portion 18 formed at the center and component elements as given below, which are accommodated in the housing 19.

The component elements include a distance measuring unit 21, the vertical rotation shaft 22, a bearing 23, the scanning mirror 24, a scanning motor 25, a vertical angle encoder 26 as a vertical angle detector, a vertical angle control unit 27, a main control unit 28, an operation input unit 29, a display unit 31, a coordinate calculating unit 32, a storage unit 33, etc.

The vertical rotation shaft 22 is rotatably supported via the bearing 23. The vertical rotation shaft 22 has a horizontal axis 22a, one end portion is extended into the recessed portion 18 and the scanning mirror 24 is fixed on the one end portion. Further, on an other end portion of the vertical rotation shaft 22, the vertical angle encoder 26 is provided. The scanning motor 25 rotates the vertical rotation shaft 22 and the scanning mirror 24 is rotated around the horizontal axis as the center, by the rotation of the vertical rotation shaft 22.

Further, it is so arranged that the axis 7a and the axis 22a cross perpendicularly to each other on a reflection surface of the scanning mirror 24.

Rotation displacement of the scanning mirror 24 is detected by the vertical angle encoder 26 and the detection result is inputted to the vertical angle control unit 27. The vertical angle control unit 27 calculates a vertical angle data of the scanning mirror 24 based on the detection result and feedback-controls the scanning motor 25 based on the vertical angle data.

A description will be given on the distance measuring unit 21.

A distance measuring light of a pulsed light is emitted from a light emitting element 35 and the distance measuring light is projected via a light projecting optical system 36 and a beam splitter 37. An optical axis of the distance measuring light as projected from the beam splitter 37 is coincided with the axis 22a and the distance measuring light is deflected at a right angle by the scanning mirror 24. By a rotation of the scanning mirror 24, the distance measuring light is rotated (scanned) within a plane perpendicularly crossing the axis 22a and including the axis 7a.

The distance measuring light as reflected by the object to be measured (hereinafter referred as a "reflected distance measuring light") enters the scanning mirror 24, is deflected by the scanning mirror 24 and is received by a photodetection element 39 via the beam splitter 37 and the photodetection optical system 38.

The distance measurement control unit 41 executes a distance measurement for each one pulse of the distance measuring light based on a time difference (i.e. a round time of the pulsed light) between a light, emission timing of the light emission element 35 and a photodetection timing of the photodetection element 39.

It is to be noted that in the figure, reference numeral 42 denotes an internal reference optical system and a distance measurement can be accomplished with high accuracy by performing a distance measurement by a time difference between the photodetection timing of the distance measuring light as received via the internal reference optical system 42 and the photodetection timing of the reflected distance measuring light.

By performing a distance measurement while rotating the scanning mirror 24 in the vertical direction, a vertical angle data and a distance measurement data are acquired, and a two-dimensional point cloud data can be acquired based on the vertical angle data and the distance measurement data. Here, an acquiring timing of the vertical angle is synchronized with a light emission timing of distance measurement.

The vertical angle data as calculated by the vertical angle control unit 27 and the distance measurement data as measured by the distance measuring unit 21 are transmitted to the coordinate calculating unit 32 by a control signal from the main control unit 28.

Further, the horizontal angle data as sent via the connector 16 are directly inputted to the coordinate calculating unit 32 or inputted to the coordinate calculating unit 32 by a control signal from the main control unit 28. Here, an inputting timing of the horizontal angle data is controlled by the main control unit 28 so as to be synchronized with the light emission timing of the distance measurement by the distance measuring unit 21.

The horizontal angle data and the vertical angle data as inputted to the coordinate calculating unit 32 are synchronized with the light emission timing of the distance measurement and coordinate data (three-dimensional data of X, Y and Z of the measuring point are calculated based on the horizontal angle data, the vertical angle data and the distance measurement data, in the coordinate calculating unit 32. The three-dimensional data as calculated are stored in the storage unit 33.

Various memory means such as a HDD, a CD, a memory card, etc. are used in the storage unit 33 and the storage unit 33 may be arranged as removable to the two-dimensional scanner unit 4a or is capable of sending the data to an external storage unit or an external data processing device via a communication means as required.

The operation input unit 29 has an input key and an information or a data necessary for the measurement are inputted to the main control unit 28 from the operation input unit 29. On the display unit 31, an input information or a measurement condition or the like from the operation input unit 29 are displayed. It is to be noted that the operation input unit 29 may be designed as a touch panel and may be used simultaneously as the display unit. In this case, the display unit 31 is omitted. The main control unit 28 corresponds to the input information and the data from the operation input unit 29, transmits control signals to the vertical angle control unit 27 and the distance measuring unit 21 and transmits a control signal to the horizontal angle control unit 12 via the connector 16.

Thus, the main control unit 28 performs control for a point cloud data acquisition of the two-dimensional scanner unit 4a and performs control of the horizontal rotating unit 3. By cooperative operation of the scanning in a vertical direction by the two-dimensional scanner unit 4a and the rotation in a horizontal direction of the horizontal rotating unit 3, two-dimensional (two directions: i.e. horizontal and vertical) scanning is executed. By the two-dimensional scanning, the vertical angle data, the horizontal angle data and the distance measurement data can be acquired. Therefore, a three-dimensional point cloud data corresponding to a surface of the object to be measured can be acquired.

A description will be given below on an operation of the surveying instrument 1 as given above.

In a case where the surveying instrument 1 is used as a laser scanner, the two-dimensional scanner unit 4a is mounted on the horizontal rotating unit 3 via the coupler 15.

The coupler 15 mechanically integrates the horizontal rotating unit 3 with the two-dimensional scanner unit 4a and coincides a mechanical axis of the two-dimensional scanner unit 4a and a rotation axis of the horizontal rotating unit 3.

Further, by assembling the horizontal rotating unit 3 and the two-dimensional scanner unit 4a, the horizontal rotating unit 3 and the two-dimensional scanner unit 4a are electrically connected via the connector 16.

The control relating to the rotation of the horizontal rotating unit 3 is executed by the horizontal angle control unit 12, and the control of the two-dimensional scanner unit 4a, i.e. the control of distance measurement by the distance measuring unit 21 and the control of rotation of the scanning mirror 24, are executed by the main control unit 28. The main control unit 28 executes an integrated control of the horizontal rotating unit 3 and the two-dimensional scanner unit 4a.

Under a condition where the distance measuring light is emitted from the distance measuring unit 21, the scanning mirror 24 is vertically rotated around the vertical rotation shaft 22 as a center, by the scanning motor 25. Further, the horizontal rotating unit 3 is horizontally rotated by the horizontal rotating motor 9.

By a cooperative operation of the vertical rotation of the scanning mirror 14 and the horizontal rotation of the horizontal rotating unit 3, the distance measuring light is scanned in two directions, i.e. in vertical direction and in horizontal direction.

Distance measurement is performed per each one pulse of a distance measuring light and a vertical angle and a horizontal angle are detected per each one pulse. By the acquirement of the vertical angle data and the horizontal angle data by synchronizing with the distance measurement data per each one pulse, a three-dimensional data of each measuring point is acquired. Further, when the distance measuring light is scanned two-dimensionally in vertical and horizontal directions, three-dimensional point cloud data can be acquired.

As described above, the coupler 15, which is used to connect the horizontal rotating unit 3 with the two-dimensional scanner unit 4a, also has an alignment function which coincides the rotation axis of the horizontal rotation shaft 7 with the mechanical axis of the two-dimensional scanner unit 4a. However, in order to further improve a mechanical accuracy under a connected condition, an arrangement as described below may be added.

A tilt sensor (not shown) for detecting a tilt in two directions (i.e. in two horizontal directions), that is, a direction perpendicularly crossing the axis of the vertical rotation shaft 22 and a direction running in parallel to the axis of the vertical rotation shaft 22 are provided on the two-dimensional scanner unit 4a. The horizontal rotating unit 3 is leveled by the leveling unit 2 and the mounting condition of the two-dimensional scanner unit 4a is corrected so that the tilt sensor detects the horizontality under a condition where the leveling unit 2 is leveled, i.e. a condition where the horizontal rotation axis is vertical. By adjusting the two-dimensional scanner unit 4a to a horizontal condition, the two-dimensional scanner unit 4a and the horizontal rotating unit 3 are connected with each other while a highly accurate leveling condition is maintained.

The two-dimensional scanner unit 4a can be separated by using the coupler 15, and a measurement unit other than the two-dimensional scanner unit 4a can be mounted on the horizontal rotating unit 3.

It is to be noted that in the present embodiment, it is so configured that the display unit 31, the operation input unit 29 and the main control unit 28 are arranged in the two-dimensional scanner unit 4a, while it may also be so configured that the display unit 31, the operation input unit 29 and the main control unit 28 are arranged in the horizontal rotating unit 3 and the control signals are sent to the vertical angle control unit 27 and the distance measuring unit 21 via the horizontal angle control unit 12 and the connector 16.

It is to be noted that a camera is provided on the housing 19 of the two-dimensional scanner unit 4a or a camera, which photographs via the scanning mirror 24, is provided in the housing 19 and the image data as acquired by the camera, the vertical angle data, the horizontal angle data and the distance measurement data at the time of image acquisition are associated with each other and stored in the storage unit 33. The data as stored are transmitted to an external data processing device (not shown) such as a PC, via a recording medium (not shown) or the like. The PC can produce a panoramic image by combining the horizontal angle data and the vertical angle data and the image data, and can add color informations of RGB to each of the coordinates of the point cloud data, which is an assembly of the coordinate data, based on this panoramic image.

Next, referring to FIG. 2, description will be given on a case where the surveying instrument 1 is constituted as a total station.

Figure 2:
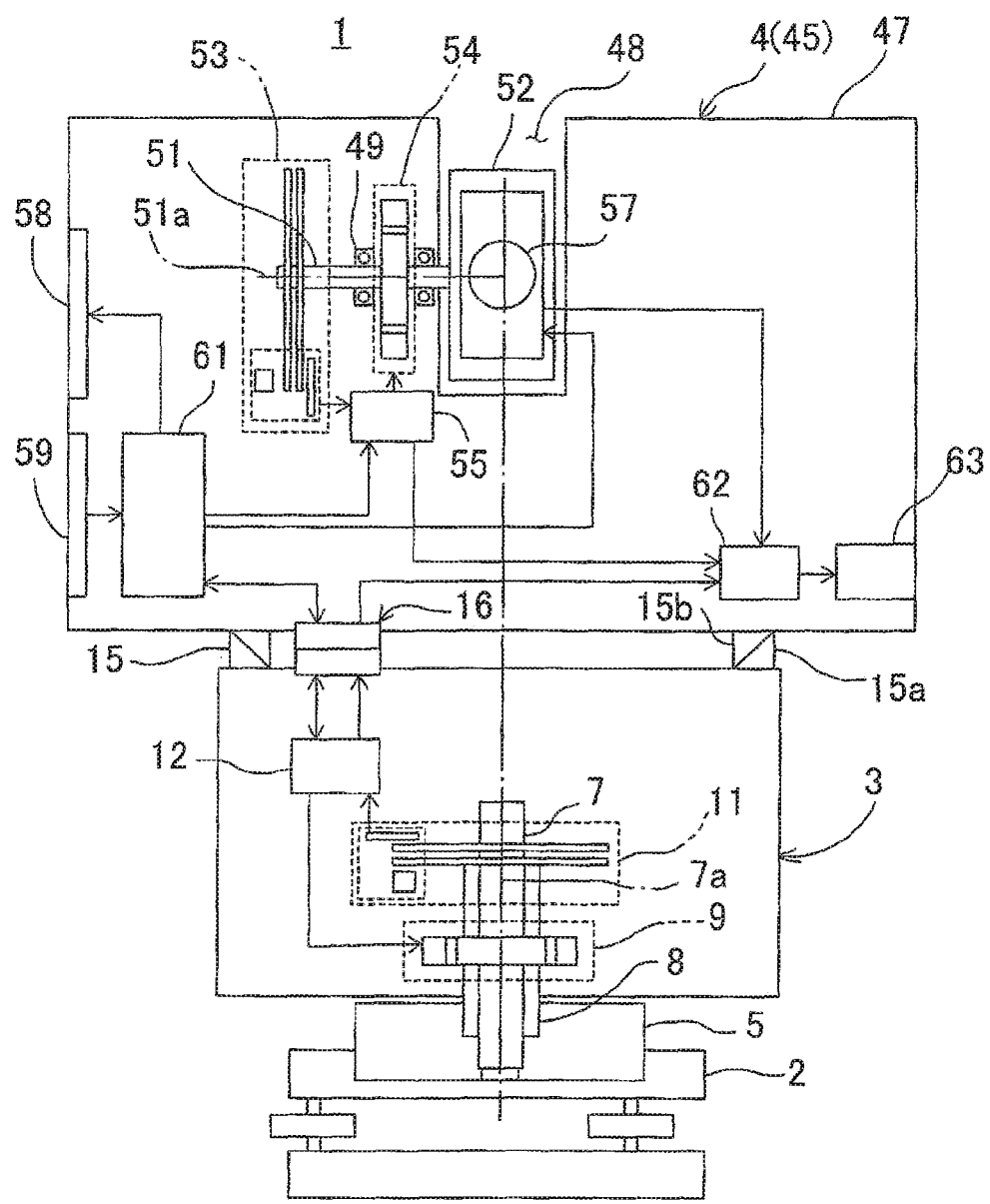
FIG. 2 represents a surveying instrument according to an embodiment of the present invention and shows a block diagram in a case where the surveying instrument is used as a total station.

It is to be noted that in FIG. 2, what are equivalent to components as shown in FIG. 1 are referred by the same symbol, and detailed description thereof will be omitted.

On a horizontal rotating unit 3, a sighting distance measuring unit 45 is mounted as a measuring unit 4 via a coupler 15. The sighting distance measuring unit 45 has a sighting telescope 57 and is capable of distance-measuring a predetermined measuring point with high accuracy.

It is to be noted that, as described above, the coupler 15 comprises a lower coupler element 15a as provided on an upper surface of the horizontal rotating unit 3 and an upper coupler element 15b as provided on a lower surface of the sighting distance measuring unit 45, and the sighting distance measuring unit 45 can be removably provided via the coupler 15.

A recessed portion 48 is formed on a housing 47. A vertical rotation shaft 51 is rotatably mounted on the housing 47 via a bearing 49.

The vertical rotation shaft 51 has a horizontal axis 51a, one end portion is extended into the recessed portion 48 and a telescope unit 52 is fixed on the one end portion. On the other end of the vertical rotation shaft 51, a vertical angle encoder 53 is provided.

A vertical motor 54 is mounted on the vertical rotation shaft 51, the vertical rotation shaft 51 is rotated by the vertical motor 54, and by the rotation of the vertical rotation shaft 51, the telescope unit 52 is rotated around the horizontal axis as a center.

An elevation angle (vertical angle) of the telescope unit 52 is detected by the vertical angle encoder 53 and the detection result is inputted to a vertical angle control unit 55. Based on the detection result of the vertical angle encoder 53, the vertical angle control unit 55 calculates a vertical angle data of the telescope unit 52 and feedback-controls the vertical motor 54 based on the vertical angle data.

A description will be given on the telescope unit 52.

The telescope unit 52 comprises the sighting telescope 57 and incorporates a distance measuring unit (not shown). Since with respect to the distance measurement principle, the distance measuring unit is the same as the distance measuring unit 21 as shown in FIG. 1, a detailed description will be omitted.

A distance measuring optical axis of the sighting telescope 57 perpendicularly crosses the axis 51a and the axis 7a, and is set in such a manner that the axis 7a and the distance measuring optical axis exist within the same plane.

A display unit 58 and an operation input unit 59 are provided in the housing 47, and a main control unit 61, a coordinate calculating unit 62 and a storage unit 63 are incorporated in the housing 47.

An information and a data as necessary for the measurement are inputted from the operation input unit 59 to the main control unit 61. Input informations or measurement conditions or the like from the operation input unit 59 are displayed on the display unit 58. It is to be noted that the operation input, unit 59 may be designed as a touch panel.

The main control unit 61 transmits a control signal corresponding to input information and data from the operation input unit 59 to the vertical angle control unit 55 and the telescope unit 52, and the control signal is transmitted to a horizontal angle control unit 12 via a connector 16.

The horizontal angle control unit 12 sends the horizontal angle data as calculated by the horizontal angle control unit 12 to the coordinate calculating unit 62 via the connector 16, based on the control signal. Here, a timing to acquire the horizontal angle data from the horizontal angle control unit 12 is synchronized with a light emission timing of distance measurement by the distance measuring unit.

The vertical angle data as calculated by the vertical angle control unit 55 and the distance measurement data as measured by the telescope unit 52 are transmitted to the coordinate calculating unit 62 by a control signal from the main control unit 61. The timing to acquire the vertical angle data is synchronized with the light emission timing of distance measurement by the distance measuring unit.

The vertical angle data as outputted from the vertical angle control unit 55 indicates an elevation angle of the sighting telescope 57 under a condition where the sighting telescope 57 sights the measuring point and the sighting distance measuring unit 45 performs a distance measurement of the measuring point and a measurement of the vertical angle under a condition where a predetermined measuring point is sighted by the sighting telescope 57. Therefore, the two-dimensional data (i.e. two-dimensional coordinates) of the measuring point can be acquired by the sighting distance measuring unit 45.

The coordinate calculating unit 62 calculates a three-dimensional data (i.e. three-dimensional coordinates) of the measuring point, based on the horizontal angle data, the vertical angle data and the distance measurement data. The three-dimensional data as acquired are stored in the storage unit 63.

A description will be given below on an operation of a surveying instrument 1, which is constituted as a total station.

By a cooperative operation of a horizontal rotation of the horizontal rotating unit 3 and a vertical rotation of the telescope unit 52, the sighting telescope 57 is directed to the measuring point, and the predetermined measuring point is sighted by the sighting telescope 57.

A distance measuring light is projected to the measuring point via the sighting telescope 57 and distance measurement of the measuring point is executed.

Further, a vertical angle when the measuring point is sighted, is detected by the vertical angle encoder 53 and the vertical angle control unit 55 and the vertical angle control unit 55 transmits the vertical angle data to the coordinate calculating unit 62.

A horizontal angle data at the time of distance measurement is calculated by the horizontal angle control unit 12, and the horizontal angle data are transmitted to the coordinate calculating unit 62 via the connector 16.

Then, the coordinate calculating unit 62 calculates the three-dimensional data based on the distance measurement result, the vertical angle data and the horizontal angle data. The calculation result is stored in the storage unit 63. Therefore, the surveying instrument 1 can perform the measurement as a total station.

Further, referring to FIG. 3, a description will be given on a case where the surveying instrument 1 is constituted as a hybrid measuring instrument 71, which has a function of a laser scanner and a function of a total station.

Figure 3:
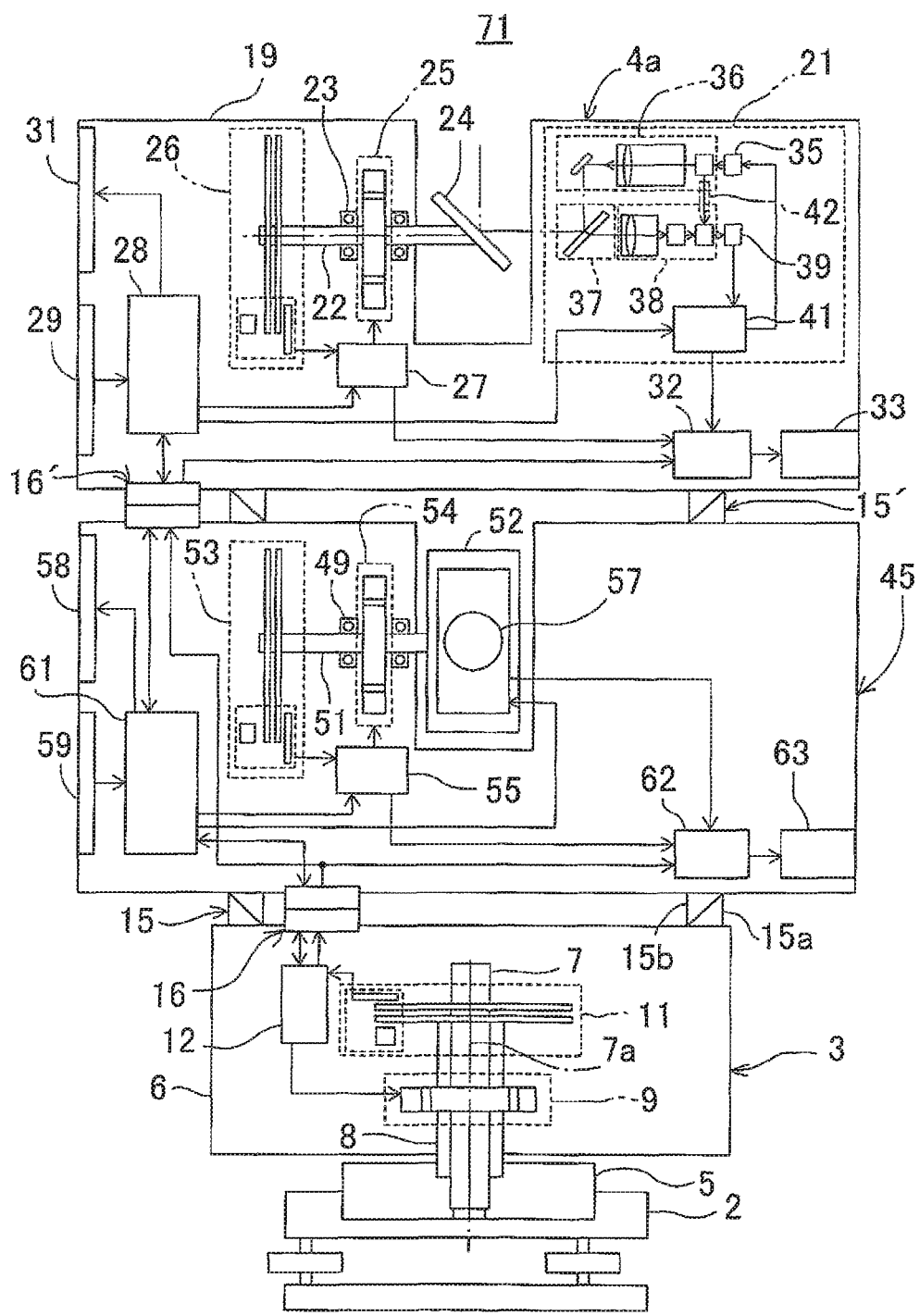
FIG. 3 represents a surveying instrument according to an embodiment of the present invention and shows a block diagram in a case where the surveying instrument is used as a hybrid surveying instrument having functions of a laser scanner and a total station.

It is to be noted that in FIG. 3, what are equivalent to components as shown in FIG. 1 and FIG. 2 are referred by the same symbol, and detailed description thereof will be omitted.

A sighting distance measuring unit 45 is installed on an upper surface of a horizontal rotating unit 3 via a coupler 15. The horizontal rotating unit 3 and the sighting distance measuring unit 45 are electrically connected by a connector 16.

Further, a two-dimensional scanner unit 4a is installed on an upper surface of the sighting distance measuring unit 45 via a coupler 15'. The coupler 15' has the same structure as that of the coupler 15, the coupler 15' couples the sighting distance measuring unit 45 with the two-dimensional scanner unit 4a and also performs an alignment of the sighting distance measuring unit 45 and the two-dimensional scanner unit 4a. Further, the sighting distance measuring unit 45 and the two-dimensional scanner unit 4a are also electrically connected with each other by a connector 16'.

In the hybrid measuring instrument 71, the sighting distance measuring unit 45 and the two-dimensional scanner unit 4a are selected and used, corresponding to a mode of measurement.

In a case where a predetermined measuring point is measured as a total station, the horizontal rotating unit 3 and the sighting distance measuring unit 45 are used.

The horizontal angle data as acquired by the horizontal rotating unit 3 is transmitted to a coordinate calculating unit 62. Further, a measurement data (distance measurement data and vertical angle data) as acquired by the sighting distance measuring unit 4a are inputted to the coordinate calculating unit 62. Based on the horizontal angle data and the measurement data, a three-dimensional data are calculated in the coordinate calculating unit 62, and three-dimensional data are stored in a storage unit 63.

Next, in a case where a measurement of an object to be measured is performed as a laser scanner, the horizontal rotating unit 3 and the two-dimensional scanner unit 4a are used.

The horizontal angle data as acquired by the horizontal rotating unit 3 are transmitted to a main control unit 28 and a coordinate calculating unit 32 via the connector 16 and the connector 16'.

A two-dimensional point cloud data as acquired by the two-dimensional scanner unit 4a are inputted to the coordinate calculating unit 32.

The coordinate calculating unit 32 calculates a three-dimensional point cloud data based on the horizontal angle data and the two-dimensional point cloud data and stores in the storage unit 33.

As a result, by a single surveying instrument 1, a precise measurement of a predetermined point can be performed as a total station and a three-dimensional point cloud data of an object to be measured can be acquired as a laser scanner.

The invention claimed is:

1. A surveying instrument comprising; a horizontal rotating unit, a measuring unit installed on the horizontal rotating unit, a coupler for mechanically coupling said horizontal rotating unit with said measuring unit, and a connector for electrically connecting said horizontal rotating unit with said measuring unit, wherein said coupler couples said horizontal rotating unit with said measuring unit and can separate from each other, said connector can electrically connect said horizontal rotating unit with said measuring unit and can separate from each other, wherein said horizontal rotating unit comprises a driving unit for rotating said measuring unit, a horizontal angle detector for detecting a horizontal angle, and a horizontal angle control unit for calculating horizontal angle data based on a signal from said horizontal angle detector and for controlling said driving unit, wherein said measuring unit comprises a distance measuring unit for performing a distance measurement, a vertical angle detector for detecting a vertical angle at a time of distance measurement, a vertical angle control unit for calculating vertical angle data based on detection results from said vertical angle detector, a coordinate calculating unit, and a main control unit, wherein said horizontal angle control unit transmits the horizontal angle data at the time of distance measurement to said coordinate calculating unit via said connector based on a control signal from said main control unit and distance measurement data by said distance measuring unit and said vertical angle data from said vertical angle control unit are inputted to said coordinate calculating unit, and said coordinate calculating unit is constituted so as to calculate three-dimensional data based on said horizontal angle data, said distance measurement data and said vertical angle data.

2. The surveying instrument according to claim 1, wherein said horizontal rotating unit has a leveling unit, said measuring unit has a tilt sensor for detecting a tilting in two horizontal directions, and a mounting condition of said measuring unit with respect to said horizontal rotating unit of said measuring unit is corrected so that said tilt sensor detects a horizontality under a condition where said horizontal rotating unit is leveled horizontally by said leveling unit.

3. The surveying instrument according to claim 2, wherein said measuring unit is a two-dimensional scanner unit, wherein said two-dimensional scanner unit emits a pulsed distance measuring light and is provided on a distance measuring unit for performing distance measurement per each said pulsed distance measuring light and on a vertical rotation shaft having a horizontal axis, and comprises a scanning mirror for rotatably irradiating said pulsed distance measuring light, a motor for rotating said vertical rotation shaft and a vertical angle detector for detecting a vertical angle of said vertical rotation axis, wherein said measuring unit is constituted so as to acquire two-dimensional point cloud data based on the distance measurement result of said distance measuring unit and on a vertical angle at the time of distance measurement as detected by said vertical angle detector, said two-dimensional point cloud data are inputted to said coordinate calculating unit and three-dimensional point cloud data are calculated by said coordinate calculating unit.

4. The surveying instrument according to claim 3, wherein said measuring unit is a sighting distance measuring unit, wherein said sighting distance measuring unit comprises a telescope unit rotatable in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs distance measurement of said measuring point under a condition where a predetermined measurement point is sighted by said telescope unit, said vertical angle control unit calculates vertical angle data of said sighting telescope under a sighted condition, and distance measurement data and said vertical angle data based on the distance measurement result of said measuring point are inputted to said coordinate calculating unit, and wherein the two-dimensional scanner unit is mounted on said sighting distance measuring unit via a second coupler, said two-dimensional scanner unit and said horizontal rotating unit are electrically connected via a second connector, it is configured so that said horizontal angle data from said horizontal angle control unit are inputted to said coordinate calculating unit of said two-dimensional scanner unit via said second connector, and it is configured so that the distance measurement of the measuring point by said sighting distance measuring unit and the acquisition of the two-dimensional point cloud data are selectively performed.

5. The surveying instrument according to claim 2, wherein said measuring unit is a sighting distance measuring unit, wherein said sighting distance measuring unit comprises a telescope unit rotatable in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs distance measurement of said measuring point under a condition where a predetermined measurement point is sighted by said telescope unit, said vertical angle control unit calculates vertical angle data of said sighting telescope under a sighted condition, and distance measurement data and said vertical angle data based on the distance measurement result of said measuring point are inputted to said coordinate calculating unit.

6. The surveying instrument according to claim 1, wherein said measuring unit is a two-dimensional scanner unit, wherein said two-dimensional scanner unit emits a pulsed distance measuring light and is provided on a distance measuring unit for performing distance measurement per each said pulsed distance measuring light and on a vertical rotation shaft having a horizontal axis, and comprises a scanning mirror for rotatably irradiating said pulsed distance measuring light, a motor for rotating said vertical rotation shaft and a vertical angle detector for detecting a vertical angle of said vertical rotation axis, wherein said measuring unit is constituted so as to acquire two-dimensional point cloud data based on the distance measurement result of said distance measuring unit and on a vertical angle at the time of distance measurement as detected by said vertical angle detector, said two-dimensional point cloud data are inputted to said coordinate calculating unit and three-dimensional point cloud data are calculated by said coordinate calculating unit.

7. The surveying instrument according to claim 6, wherein said measuring unit is a sighting distance measuring unit, wherein said sighting distance measuring unit comprises a telescope unit rotatable in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs distance measurement of said measuring point under a condition where a predetermined measurement point is sighted by said telescope unit, said vertical angle control unit calculates vertical angle data of said sighting telescope under a sighted condition, and distance measurement data and said vertical angle data based on the distance measurement result of said measuring point are inputted to said coordinate calculating unit, and wherein the two-dimensional scanner unit is mounted on said sighting distance measuring unit via a second coupler, said two-dimensional scanner unit and said horizontal rotating unit are electrically connected via a second connector, it is configured so that said horizontal angle data from said horizontal angle control unit are inputted to said coordinate calculating unit of said two-dimensional scanner unit via said second connector, and it is configured so that the distance measurement of the measuring point by said sighting distance measuring unit and the acquisition of the two-dimensional point cloud data are selectively performed.

8. The surveying instrument according to claim 1, wherein said measuring unit is a sighting distance measuring unit, wherein said sighting distance measuring unit comprises a telescope unit rotatable in a vertical direction, a motor for rotating said telescope unit in a vertical direction, and a vertical angle detector for detecting a vertical angle of said telescope unit, wherein said telescope unit has a sighting telescope and a distance measuring unit, said distance measuring unit performs distance measurement of said measuring point under a condition where a predetermined measurement point is sighted by said telescope unit, said vertical angle control unit calculates vertical angle data of said sighting telescope under a sighted condition, and distance measurement data and said vertical angle data based on the distance measurement result of said measuring point are inputted to said coordinate calculating unit.

* * * * *